Nov. 20, 1956 L. O. BOICE 2,770,839
VULCANIZING MACHINE
Filed Sept. 17, 1953 3 Sheets-Sheet 1

INVENTOR
Lendall O. Boice

BY Mason, Fenwick & Lawrence
ATTORNEYS

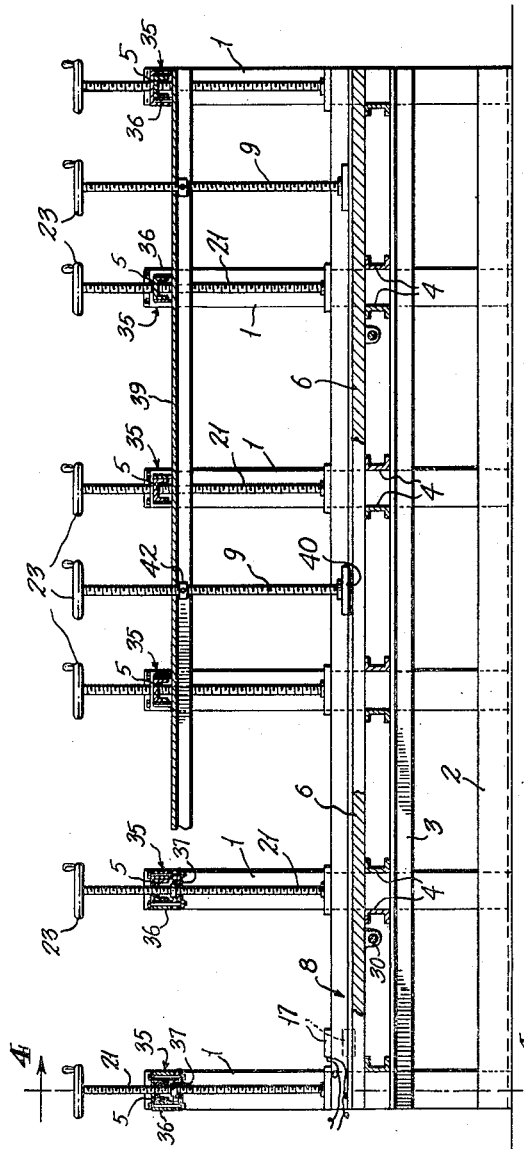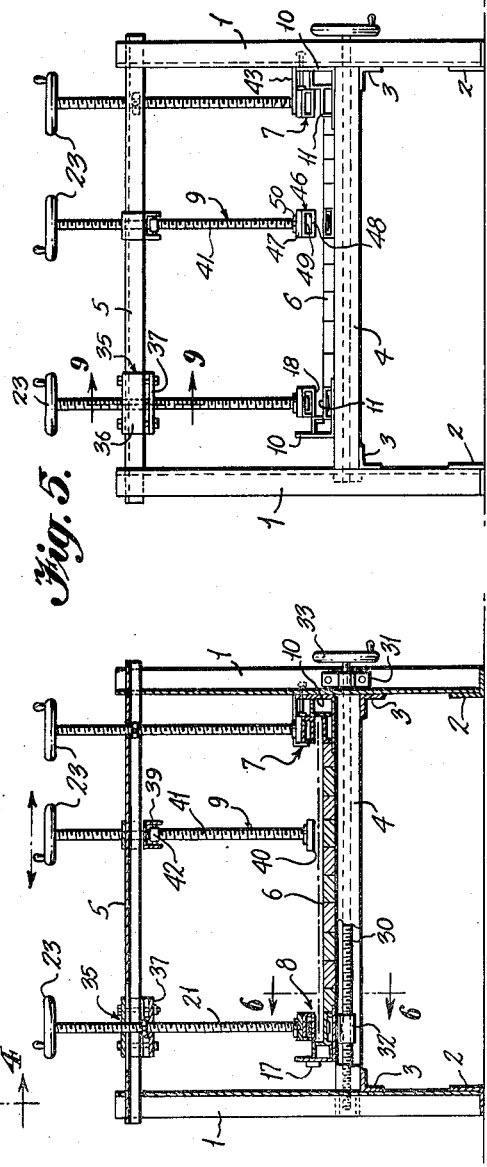

Nov. 20, 1956
L. O. BOICE
2,770,839
VULCANIZING MACHINE
Filed Sept. 17, 1953
3 Sheets-Sheet 3
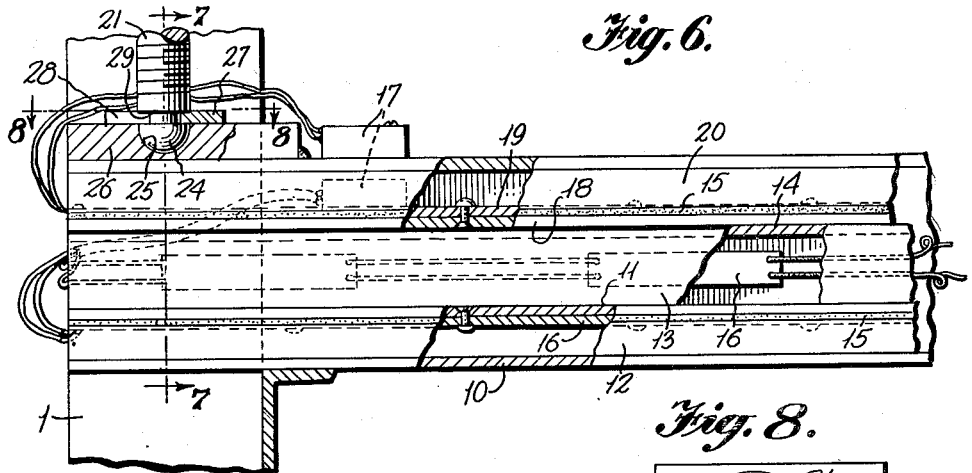
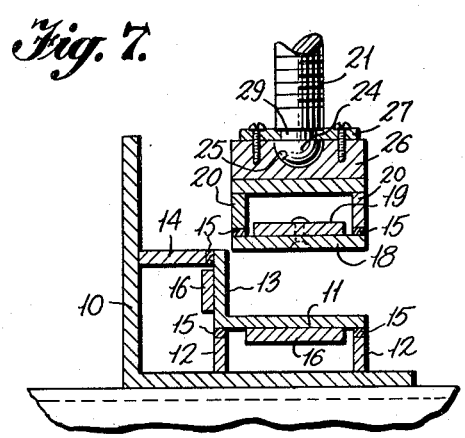
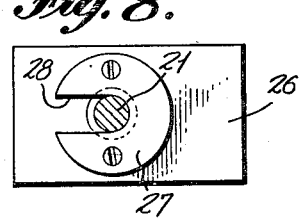
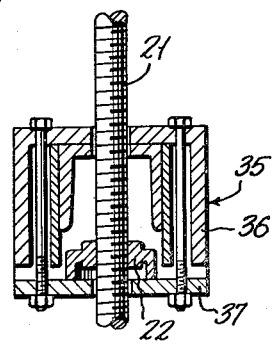
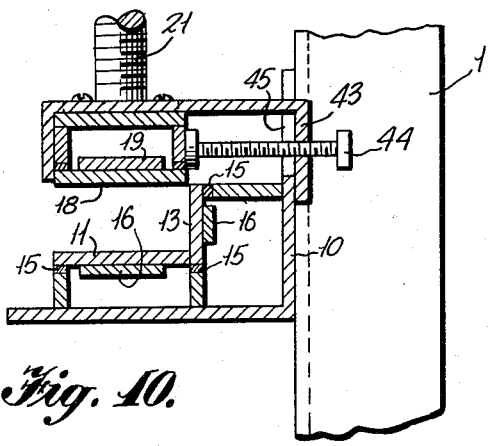
INVENTOR
*Lendall O. Boice*
BY *Mason, Fenwick & Lawrence*
ATTORNEYS

United States Patent Office 2,770,839
Patented Nov. 20, 1956

2,770,839

VULCANIZING MACHINE

Lendall Oren Boice, Bluefield, W. Va.

Application September 17, 1953, Serial No. 380,690

8 Claims. (Cl. 18—18)

This invention relates to vulcanizing machines, and more particularly to such machines for repairing the edge and central portions of strip rubber material such as conveyor belts, and the like.

Rather wide, rubber-covered belts are used as conveyors in factories and mines, and frequently become frayed at the edges and torn in the center. Repairs are made by placing new rubber over the edge or tear and applying heat and pressure. Known vulcanizers for this purpose are relatively short, being only about three feet long; they can apply heat directly only to the top and bottom surfaces, as they have no heating means for contacting the vertical edge; and, they can only vulcanize one side edge at a time. A stock of parts must be kept on hand, as different sizes must be used for different thickness of belts.

The primary object of the present invention is to provide a vulcanizer for strip material which will apply heat to the vertical side edge of the material simultaneously with the application of heat to the top and bottom surfaces, so that the vulcanization is uniform.

A further object is to provide such a machine in which the parts are fully adjustable in order to apply the required pressure in all directions.

Another object is the provision of a machine by means of which both side edges and the center portions of a belt may be vulcanized at the same time.

A still further object is the provision of a machine of considerable length so that long lengths of belt may be vulcanized at one time to cut down on inequalities caused by small machines where many applications are necessary and different pressures are obtained at different applications.

Other objects of the invention will become apparent from the following description of one practical embodiment thereof when taken in conjunction with the drawings which accompany, and form part of, this specification.

In the drawings:

Figure 3 is a vertical, longitudinal section through the machine taken on the line 3—3 of Figure 2;

Figure 4 is a vertical, transverse section taken on the line 4—4 of Figure 3;

Figure 5 is a view similar to Figure 4 showing the center pressure-applying member equipped with a heating element;

Figure 6 is a detail section taken on the line 6—6 of Figure 4, showing one of the edge-clamping and heating assemblies;

Figure 7 is a vertical, transverse section taken on the line 7—7 of Figure 6;

Figure 8 is a horizontal section taken on the line 8—8 of Figure 6 showing the manner of attaching the pressure elements to the adjusting rods;

Figure 9 is a vertical section taken on the line 9—9 of Figure 5; and,

Figure 10 is a detail vertical, transverse section taken on the line 10—10 of Figure 1.

Figures 1, 2:
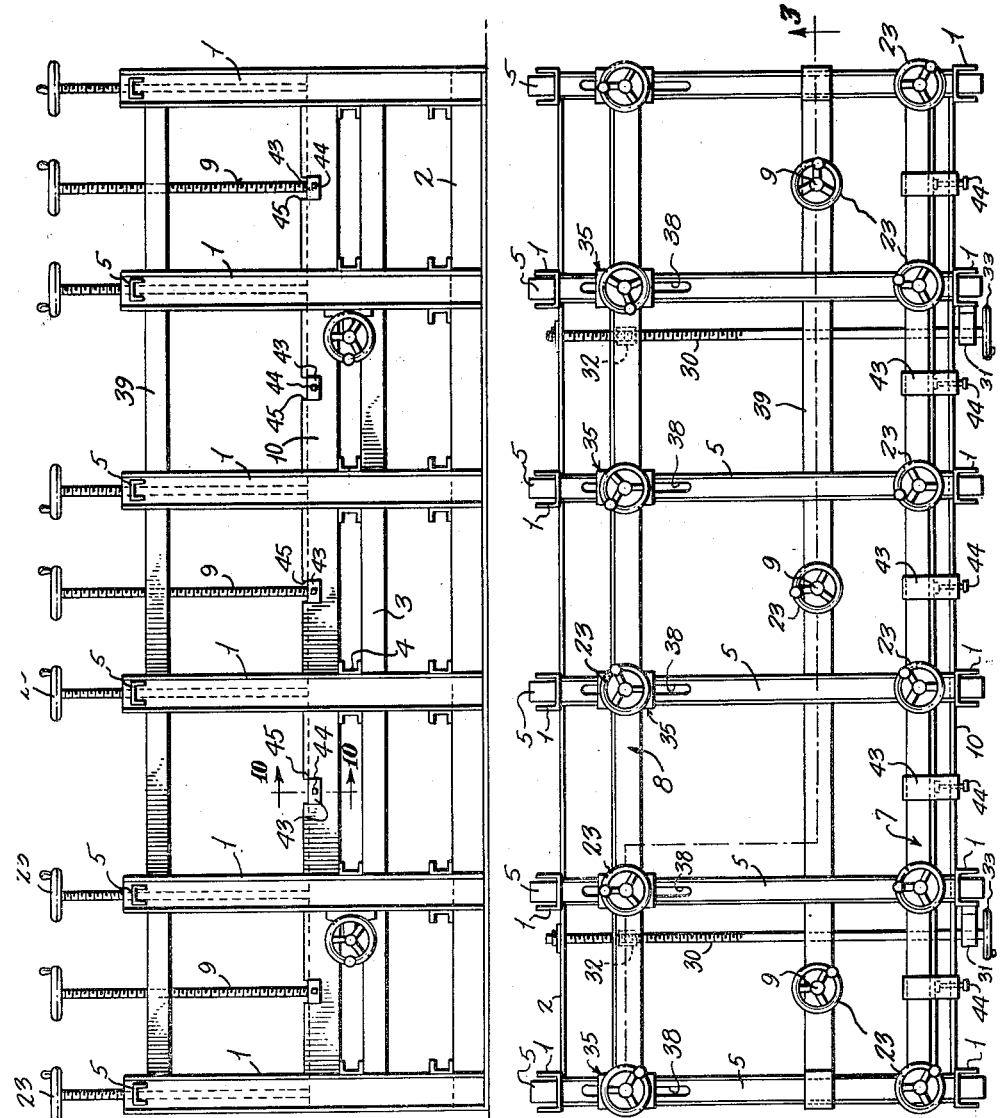
Figure 1 is a side elevation of a vulcanizing machine embodying the principles of the present invention.
Figure 2 is top plan view of the machine.

In general, the invention comprises a machine in which a plurality of pressure-applying members, each of which may carry heating means, are adjustably mounted upon a frame in such manner that they may be brought into pressure contact with the sides and edges of a sheet of strip material such as a conveyor belt.

Referring to the drawings in detail, there is shown a frame of considerable length, for example, twenty feet, composed of pairs of transversely spaced vertical posts 1, with the pairs longitudinally spaced along the machine. The pairs of posts are tied together by the longitudinal base stringers 2, the intermediate stringers 3, the transverse channel members 4 which have their ends resting upon the stringers 3 and secured to posts, and the upper transverse channel 5 connected between the tops of the posts of each pair. A flooring 6 of removable members laid upon the lower transverse channels 4 is provided to form a support for the belt being vulcanized. By removing the side floor members, as will be described, adjustment for different widths of belts may be made.

The vulcanizers are mounted upon the frame and include a fixed position edge vulcanizer 7, a laterally movable edge vulcanizer 8, and a center pressure member 9, which may be converted into a vulcanizer for making center repairs. Both edge vulcanizers are adjustable to accommodate belts of different thickness.

The fixed position vulcanizer 7 is mounted upon an angle member 10 which is fixed to the lower transverse channels 4. A horizontal heater plate 11 is mounted upon supports 12 to lie parallel to the horizontal web of the angle member 10. The plate 11 is the pressure and heat transfer member to contact the under side of one edge of a belt to be vulcanized. The edge of the belt is contacted by the vertical heater plate 13 which is mounted upon supports 14 from the vertical web of the angle member. Both heater plates extend the length of the machine. The two plates are in contact to form a 90° angle between them. The plates are insulated from their supports, as at 15, and each plate has strip heaters 16 running the length of the plates out of contact with the belt. The heaters are connected to any suitable electrical source, and are maintained at constant temperature by means of the thermostat 17. The upper side of the belt is contacted by the heater plate 18, heated by strip heater 19, and carried by channel 20 suspended by a plurality of rods 21. The heater plate 18 also extends the length of the machine. Each of the rods 21 is threaded, and passes through a sleeve nut 22 secured to the overlying upper transverse channel 5. A hand wheel 23 is fixed to the top of each rod 21 to rotate the rod and raise and lower the top heater plate 18 to adjust pressure on the belt. The bottom of each rod is formed into a ball 24 to fit into a socket 25 in a block 26 carried by the channel supporting the heater strip 18. A retaining washer 27 fits over the ball to hold it in place. The washer is provided with a slot 28 extending from the center to the periphery to fit in a peripheral groove 29 in the rod above the ball. In assembling the device, the ball is inserted in the socket, the washer slipped around the rod at the groove, and the washer fastened to the top of the block. This will secure the rod to the heater plate and permit the rod to rotate in the block.

The transversely movable vulcanizer 8 is constructed similarly to the fixed vulcanizer, and the same reference numerals have been used on similar parts. The base angle member 10, however, is not fixed to the transverse channels of the frame but is mounted upon screw threaded rods 30 journalled in bearings 31 mounted upon the posts 1. The angle member carries threaded sleeves 32 beneath its base which ride upon the rods 30. Hand wheels 33 are fixed to the rods to facilitate rotation. Rotation of the rods will cause the movable vulcanizer to move toward and from the fixed vulcanizer.

Due to the fact that the heating unit 8 is movable, its upper plate must be movable. To accomplish this, supporting rods 21 of unit 8 are threaded through sleeves 34 mounted in carriages 35, slidable upon the upper transverse frame channels 5. The carriages comprise channels 36 which fit over and slide upon channels 5, and lower plates 37 bolted to the channels 36. The upper transverse channels 5 are slotted, as at 38, to permit the rods 21 to move longitudinally of them.

The center pressure members 9 are mounted upon a longitudinally extending bar 39 which is slidably mounted upon the end upper transverse channels 5 so that it can be moved transversely of the frame to move the pressure members to various positions of adjustment. The pressure members consist of plates 40 swivelly fixed to the lower ends of threaded rods 41 movable vertically through threaded sleeves 42 fixed to the bar 39.

In using the machine, the belt to be vulcanized having new rubber on the edges is placed upon the flooring 6 of the machine with one bottom edge resting on the heating plate 11 and the side edge in contact with the side heater plate 13 of the fixed vulcanizer 7. The hand wheels 33 are rotated to adjust the unit 8 so that its side heater plate 13 will be in proper pressure contact with the other edge of the belt. The hand wheels 23 of both the fixed and movable units are rotated to bring the upper heater plates 18 into pressure contact with the top edges of the belt. The center pressure members are then brought against the central portion of the belt to hold it in place against the flooring. When wider or narrower belts are to be worked upon sections of flooring may be added or removed so that the movable unit may be adjusted to bring the side edges of the belt into tight contact with the side heater plates. When the heaters are turned on heat will be applied equally along the side, top and bottom of the edge portions of the belt.

After the units have been adjusted, as above described, clamps 43 are employed to hold the top plates of the units in tight abutment with the side plates. These clamps are U-shaped and will be slipped over the unit so that one arm will bear upon the inner edge of the top plate and an adjusting screw 44 which is threaded through the other arm will be brought into binding engagement with the side plate. The base angle members 10 have their vertical webs notched at the top, as at 45, to permit the clamps to be positioned.

Due to the fact that the machine is of substantial length, repairs can be made along great lengths of the belt with uniformity which is not possible with shorter machines where the process must be repeated several times to make the entire repair. It is impossible to obtain uniform pressures during repeat processes and inequalities are bound to occur with short machines. With the present invention, equal pressures may be obtained along the entire length, and the heating is applied not only to the top and bottom surfaces but to the side edges as well.

When it is desired to make center repairs, heating units may be set up beneath the belt if it is desired to work upon the bottom of the belt, and heating units may be connected to the pressure members 9 to make repairs upon the top surface. Figure 5 shows a heating unit attached to the center member. The unit 46 consists of a channel support 47 carrying a heating plate 48 to which a strip heater 49 is attached. The unit is connected to the rods 41 by means of a washer 50 in the same manner that plates 18 are connected to the rods 21.

While in the above a practical embodiment of the invention has been shown and described, it will be understood that the details of construction disclosed are merely by way of example and the principles of the invention may be carried out by other means within the scope of the appended claims.

What is claimed is:

1. In a machine for vulcanizing repair of strip material comprising, a frame, a vulcanizing unit having top, bottom and edge heater plates fixed upon the frame longitudinally thereof, and a second vulcanizing unit having top, bottom and edge heater plates mounted upon the frame parallel to the first unit and movable transversely of the frame toward and from the fixed unit.

2. In a machine for vulcanizing repair of strip material as claimed in claim 1, the top heater plates of both the fixed and movable units being adjustable toward and from the bottom plates of the respective units.

3. In a machine for vulcanizing repair of strip material as claimed in claim 1, movable clamping plates to engage the central portions of the strip material to hold it in place upon the machine.

4. In a machine for vulcanizing repair of strip material comprising, a frame, a vulcanizing unit having a horizontal bottom heater plate and a vertical edge heater plate connected thereto, said unit being positioned longitudinally of the frame and fixed thereto, a horizontal top heater plate parallel to the bottom heater vertically movable toward and from the bottom heater, and a second vulcanizing unit parallel to the first and in the same horizontal plane having a horizontal bottom heater plate and a vertical edge heater plate connected thereto, said second unit being mounted for transverse movement relative to said frame, means to move said second unit transversely of the frame, and a horizontal top heater plate vertically movable toward and from the bottom heater plate of said second unit and movable transversely of the frame to positions in vertical alignment with the bottom heater plate of said second unit.

5. In a machine for vulcanizing repair of strip material as claimed in claim 4, movable clamping plates to engage the central portions of the strip material to hold it in place upon the machine.

6. In a machine for vulcanizing repair of strip material comprising a frame including a floor, a pair of transversely spaced angle members extending the length of said frame, one on either side of said floor, one of said angle members being fixed to said frame and the other connected to the frame for transverse movement toward and from the fixed angle member, means to adjust the movable angle member, vulcanizing units mounted upon said angle members, each vulcanizing unit including bottom, edge and top plates, the bottom and edge plates being unitary and fixed to the respective angle members, the top plates being mounted for vertical movement toward and from the bottom plates in edge contact with the edge plates, the plates of the respective units arranged to form channels having their open sides facing one another, means to move the top plates vertically, and strip heaters mounted on the rear sides of said vulcanizing unit plates.

7. In a machine for vulcanizing repair of strip material as claimed in claim 6, said flooring composed of a plurality of longitudinally extending removable sections.

8. In a machine for vulcanizing repair of strip material as claimed in claim 6, clamps engageable with said top plates and said angle members to bind said top plates tightly against said edge plate.

References Cited in the file of this patent

UNITED STATES PATENTS

| 423,074 | Newell | Mar. 11, 1890 |
| 1,126,456 | Harp | Jan. 26, 1915 |
| 1,183,861 | Everett | May 23, 1916 |

FOREIGN PATENTS

| 683,720 | France | Mar. 4, 1930 |